F. PAULSEN.
PNEUMATIC TIRE CORE.
APPLICATION FILED MAR. 2, 1920. RENEWED JAN. 3, 1921.
1,368,527.
Patented Feb. 15, 1921.
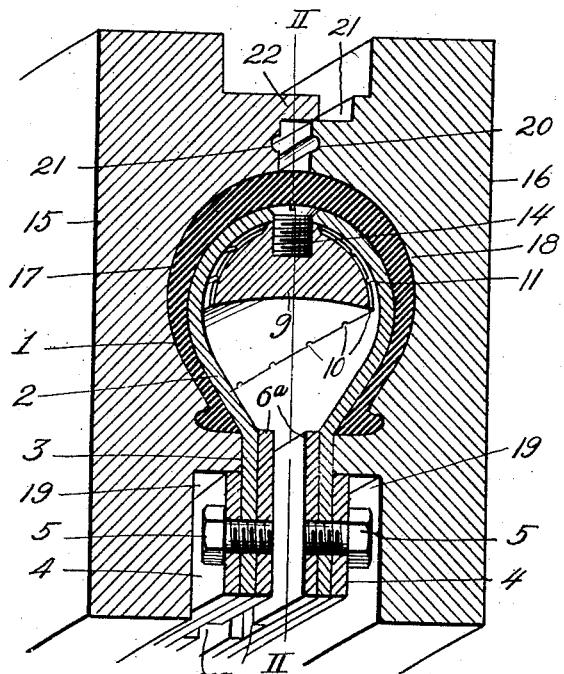
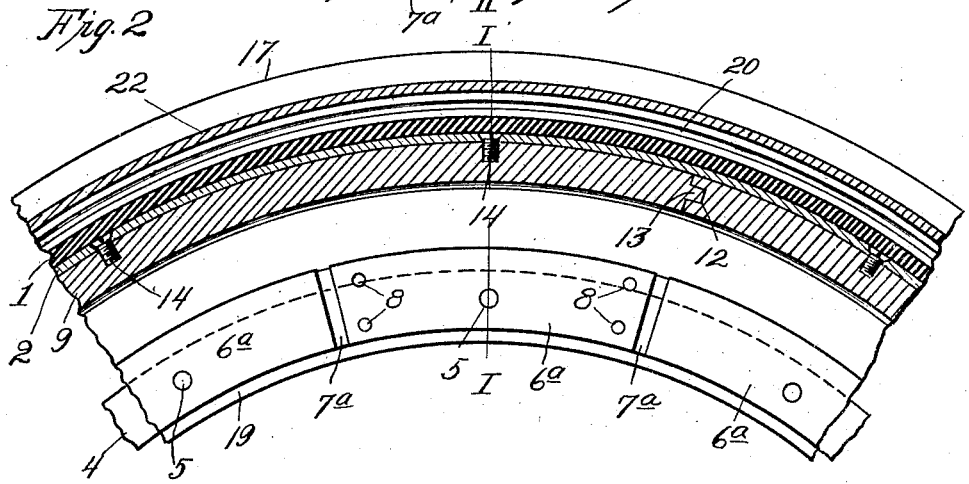
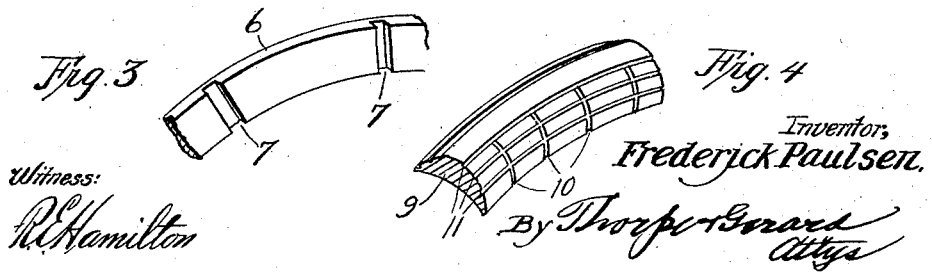
Inventor;
Frederick Paulsen.

UNITED STATES PATENT OFFICE.

FREDERICK PAULSEN, OF KANSAS CITY, MISSOURI.

PNEUMATIC-TIRE CORE.

1,368,527.  Specification of Letters Patent.  Patented Feb. 15, 1921.

Application filed March 2, 1920, Serial No. 362,790. Renewed January 3, 1921. Serial No. 434,844.

*To all whom it may concern:*

Be it known that I, FREDERICK PAULSEN, a citizen of the United States of America, and resident of Kansas City, in the county of Jackson, State of Missouri, have invented a certain new and useful Improvement in Pneumatic-Tire Cores, of which the following is a complete specification.

This invention relates to pneumatic tire cores, and has for its object to produce a hollow tire core provided with one or more passages for establishing communication between the interior of the mold and heater press, to give steam access to the interior of the core for internal curing or vulcanizing action on the tire.

A further object is to produce a resilient core which when inclosed in a casing and compressed in a mold shall effect uniform stretching to tensioning of the casing and thereby insure contact between the entire juxtaposed surfaces of the fabric layers of the casing and the avoidance of wrinkling or buckling destructive of longevity in any tire.

With these and other objects in view, the invention consists in certain novel and useful features of construction and combinations of parts as hereinafter described and claimed; and in order that it may be fully understood reference is to be had to the accompanying drawing, in which:—

Figure 1 is a cross section of a tire core embodying the invention, the figure also showing the mold and the casing interposed between the core and mold;

Fig. 2 is a central circumferential section of a fragment of the construction disclosed by Fig. 1, the section being taken on the line II—II of Fig. 1;

Fig. 3 is a perspective view of a fragment of a ring hereinafter referred to; and Fig. 4 is a fragmentary perspective view of a reinforcement of the core.

Referring to the drawing in detail, 1 indicates a pneumatic tire casing, the same being composed as usual of pieces of fabric secured together in layers, and rubber superimposed on the fabric and of greatest thickness at the central or tread portion of the casing.

A resilient core of metal by preference, such as spring steel, is of form to fit snugly in the tire casing and is of substantially horseshoe shape in cross section and provided at the inner edges of its side walls with inwardly projecting side flanges 3. These flanges are formed with external outwardly facing shoulders 4 produced preferably by means of rings secured to the outer sides of the flanges by screw bolts 5.

To produce one or more ports establishing communication with the interior of the core, a pair of rings 6 are secured flatly against the inner sides of the flanges 3 by means of the said bolts 5, and one or both of said rings is or are provided with a groove or channel 7 extending from the inner edge or edges of the rings to the outer edge or edges thereof, this groove or channel constituting a port for maintaining communication with the interior of the core when the latter has been compressed until the rings 6 are pressed tightly together. In Fig. 2, segmental metal plates 6$^a$ take the place of the rings 6, and are spaced apart at their ends to provide the ports 7$^a$ corresponding to port 7, and in this case to guard against pivotal shifting of the plates 6$^a$, they are perforated to receive pins 8 projecting inwardly from the flanges 3. In effect, the flanges 3, the rings 4 and the rings 6 or plates 6$^a$, constitute a single piece, so that it can be said that the flanges of the core are provided with a port or ports leading into the interior of the core and are also provided with external outwardly facing shoulders constituted by the outer edges of rings 4.

Within the outer portion of the core is a reinforcing ring 9 the same being of radius somewhat less than the interior of the core when the same is in normal condition so as to leave between the sides of the reinforcement or reinforcing member 9 and the core, outwardly tapering and converging spaces as shown clearly in Fig. 1. When the core is collapsed preliminary to the vulcanizing of the tire as hereinafter referred to, the outer half of the core fits flatly and squarely against the outer or curved surface of said member 9, and in order that steam may have access to substantially the entire inner surface of the core when collapsed, said member 9, is provided with intersecting transverse and circumferential grooves 10 and 11 respectively, as shown most clearly by Fig. 4.

The reinforcing member is preferably in the form of a split ring having a socket 12 at one end and a tenon 13 at the other for interlocking engagement, and to secure the member in fixed position to the core, screw bolts 14 extend through the core and into said member. It will be understood of course that the reinforcing member 9 should be made in sections so that it may readily be inserted, which would be impossible if it was a continuous piece and simply split at a single point. This feature of construction however, is immaterial in this connection as it forms no part of the invention itself.

Preliminary to the vulcanizing of the tire casing, the tire and core are fitted in a mold of the construction shown or of any other suitable type. The mold shown comprises two members 15 and 16 respectively grooved at 17 and 18 to accommodate the type of tire casing. The mold members are also recessed in their inner edges at 19 to accommodate the rings 4 constituting the external shoulders of the flanges of the core. Outward of the casing the members of the mold are grooved as at 20 to accommodate excess rubber during the vulcanizing operation, and the outer portions of the cores have a tongue and grooved relation as at 21 and 22 so that the mold members shall be moved in undeviating line when compressed to effect the collapse of the core until the walls thereof tightly embrace the reinforcement 9 and the rings 6 come flatly together as hereinbefore explained. In this compression action the movement inwardly of the opposite side walls of the core, tends to lengthen the transverse circumferential extent of the tire with the result suggested in applicant's patent issued June 11th, 1918, No. 1,269,500, accomplishing such object more efficiently however, in that the walls of the core are not so sharply bent as where they fulcrum on the opposite side margins or corners of the reinforcing member, as is true on the patent above referred to. With the core in collapsed condition the curing or vulcanizing process is performed within a heater press or the like in the usual or any preferred manner, it being understood that the steam which cures the exterior portion of the tire through the mold member, also obtains access to the interior of the core and then by way of the intersecting grooves in the reinforcement 9, so that the entire surface of the core may be uniformly heated from the inside thereof and thus cure the casing from the inside as well as the outside. This facilitates the uniform curing operation from both within and without the casing and hence reduces the cost of the operation and guards against overcuring of the outer portion and the result is a much stronger and more durable tire.

From the above description taken in connection with the drawing, it is believed that the invention will be fully understood and that it is apparent that the invention embodies the features of advantage set forth as advantageous and desirable, and that modifications may be resorted to without departing from the spirit and scope of the appended claims or departing from the principle of construction involved.

I claim—

1. A circular tire core of hollow resilient material, for fitting tightly in a tire casing, and a reinforcing member within the core and secured to the tread portion thereof; said member conforming substantially to the contour of the core but of smaller cross sectional radius than the inner side thereof to normally provide outwardly converging and tapering spaces between it and the core.

2. A circular tire core of hollow resilient material, for fitting tightly in a tire casing, and a reinforcing member within the core and secured to the tread portion thereof, and conforming substantially to the contour of the core but of smaller cross sectional radius than the inner side thereof to normally provide outwardly converging and tapering spaces between it and the core; said reinforcing member having grooves in its outer face accessible to steam introduced within the core when the latter is tightly compressed upon the grooved face of the said member.

3. A circular tire core of hollow resilient material, for fitting snugly in a tire casing, and a reinforcing member within the core and secured to the tread portion thereof and conforming substantially to the contour of the core but of smaller cross sectional radius than the inner side thereof to normally provide outwardly converging and tapering spaces between it and the core; said reinforcing member having intersecting cross and circumferential grooves in its outer face, the cross grooves extending through the inner face of the member to receive steam introduced within the core when the same is tightly compressed upon the grooved face of said member.

4. A hollow resilient tire core of substantially horseshoe form in cross section, and adapted for lateral compression to close the space between the edges of its side walls, and provided with a port leading to the interior of the core when compressed.

5. A hollow resilient tire core of circular form and provided at the inner edges of its walls with inwardly projecting flanges adapted to be closed together; said flanges being formed with a port for establishing communication with the interior of the core.

6. A hollow resilient tire core of circular form and provided at the inner edges of its side walls with inwardly projecting flanges adapted to be closed together; said flanges being formed with a port for establishing communication with the interior of the core and with outwardly facing external shoulders.

7. A hollow resilient tire core of circular form and provided at the inner edges of its side walls with inwardly projecting flanges adapted to be closed together; said flanges being formed with a port for establishing communication with the interior of the core and with outwardly facing external shoulder, and a mold comprising two members fitting against and inclosing a tire casing fitted snugly on the core, and provided with recesses receiving the shouldered portion of said flanges and with circular ribs fitting against the outer faces of said flanges between the shoulders thereof and the inner edges of the tire casing.

8. A hollow resilient tire core of circular form and provided at the inner edges of its side walls with inwardly projecting flanges adapted to be closed together; said flanges having reinforcing rings secured to their inner faces and provided conjointly with a port establishing communication with the interior of the core.

9. A hollow resilient tire core of circular form and provided at the inner edges of its side walls with inwardly projecting flanges adapted to be closed together; said flanges having reinforcing rings secured to their inner faces and provided conjointly with a port establishing communication with the interior of the core, and rings secured to the outer faces of the said flanges and forming outwardly disposed shoulders.

In witness whereof I hereto affix my signature.

FREDERICK PAULSEN.